INVENTORS
T. FINLEY BURKE
SIDNEY SHAPIRO

INVENTORS
T. FINLEY BURKE
SIDNEY SHAPIRO

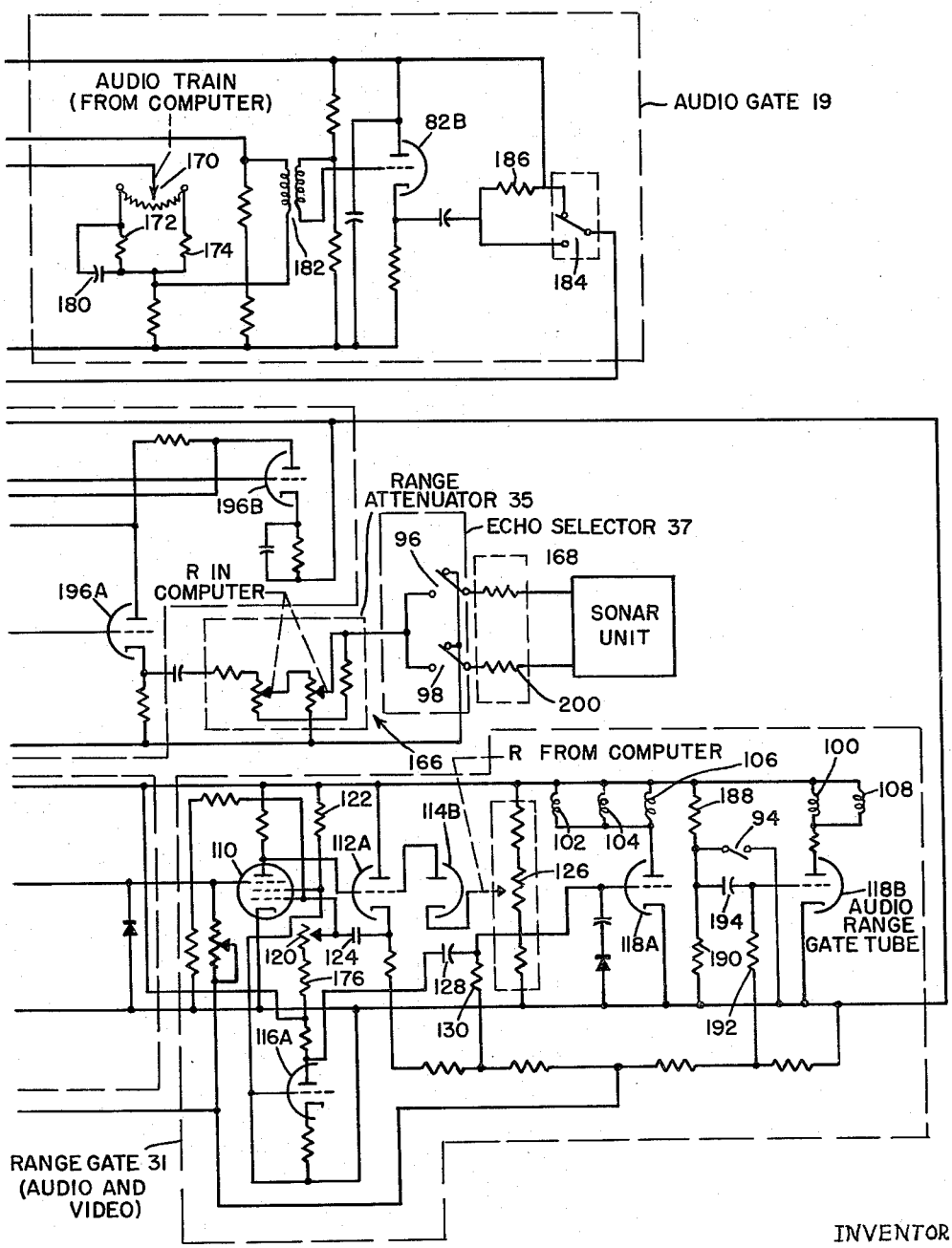

INVENTORS
T. FINLEY BURKE
SIDNEY SHAPIRO
BY
Lawrence S. Epstein
ATTORNEY

United States Patent Office 2,994,135
Patented Aug. 1, 1961

2,994,135
COMPUTER
T. Finley Burke, Arlington, and Sidney Shapiro, Falls Church, Va., assignors, by mesne assignments, to the United States of America as represented by the Secretary of the Navy
Filed July 27, 1955, Ser. No. 524,827
3 Claims. (Cl. 35—10.4)

This device relates in general to sonar training equipment and more specifically to a device that provides training of a sonar attack team by generating information to represent own ship and a target ship and inserting this information into a standard sonar set.

At the present time, the standard procedure that is utilized to train a group of individuals in the technique of utilizing sonar equipment comprises the actual operation of two or more ships on navigational waters. This procedure is expensive, wasteful, time consuming and restricts the training time to daylight hours and clear weather.

The present device cooperates with and generates within standard shipboard sonar equipment a simulated target that appears in both the aural and visual presentation channels of the sonar equipment. Said sonar equipment remains operative during the simulation of a target, thus indicating the simulated target and any actual targets that are present within the scanning field. Thus the simulated target can be generated, and the sonar team trained, while the ship is underway or, by operation of the required controls, when the ship is at dockside.

The generated simulated target appears on the oscilloscopes of the sonar unit in its proper geographical position and in the audio channel at the appropriate instant for the correct duration of time.

The principal object of this invention is to provide a device adapted to generate a synthetic target on a sonar unit.

An additional object is to generate a synthetic target echo signal that varies in strength in accordance wtih the simulated range.

Another object is to generate a synthetic target echo signal that varies in frequency in accordance with the geometry of the simulated problem.

Still another object is to provide a device that will train a sonar team regardless of the speed or location of the ship.

Other objects and many of the attendant advantages of this invention will be readily appreciated as the same becomes better understood by reference to the following detailed description when considered in connection with the accompanying drawings wherein.

Figure 6A:
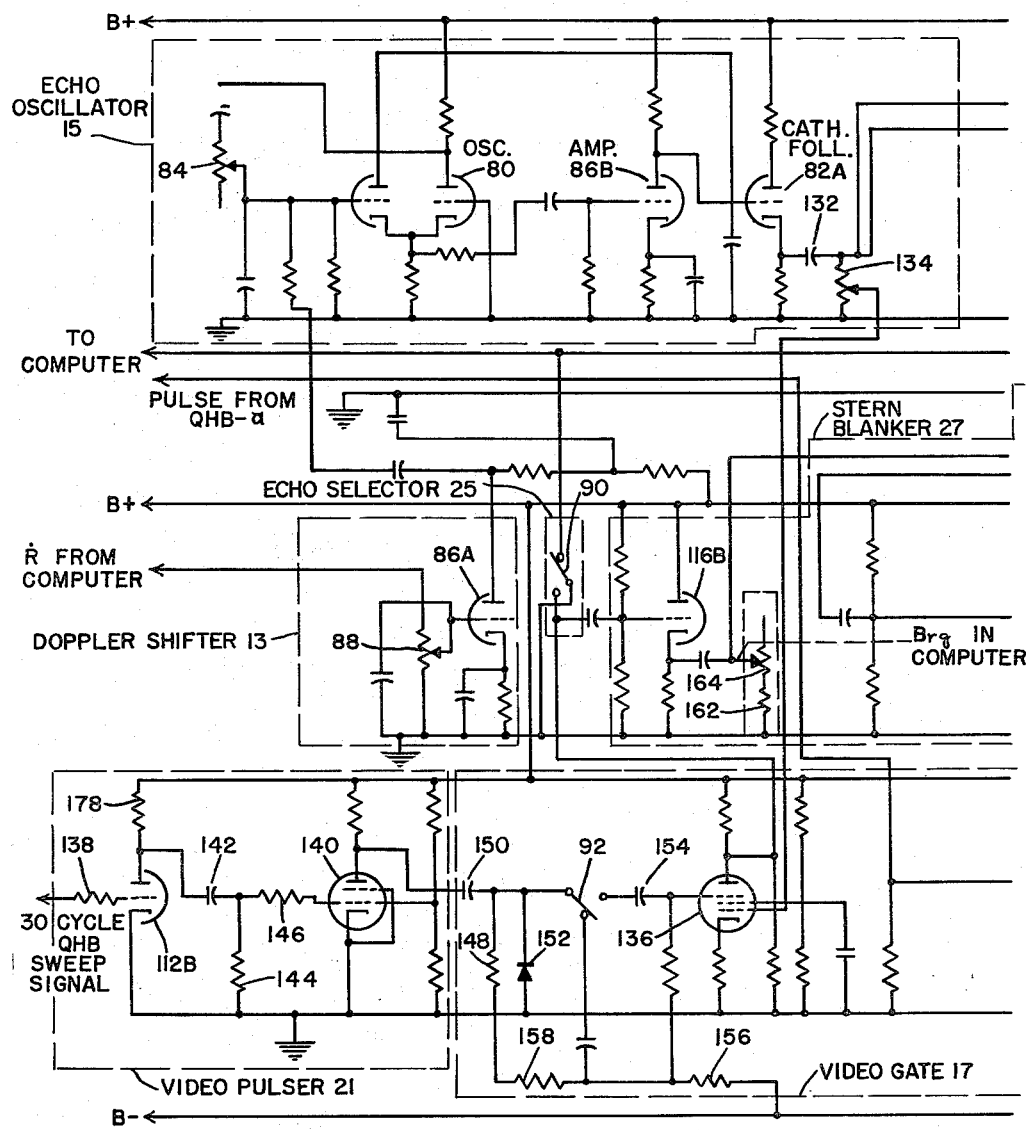
Figure 7:
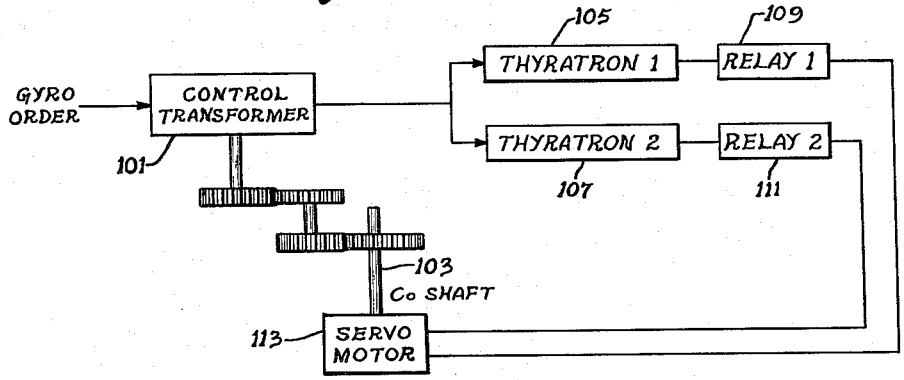

FIGS. 6A and 6B together illustrate a schematic diagram of the simulator,

FIG. 7 is a block diagram of the $C_o$ position servomechanism; and

Figure 8:
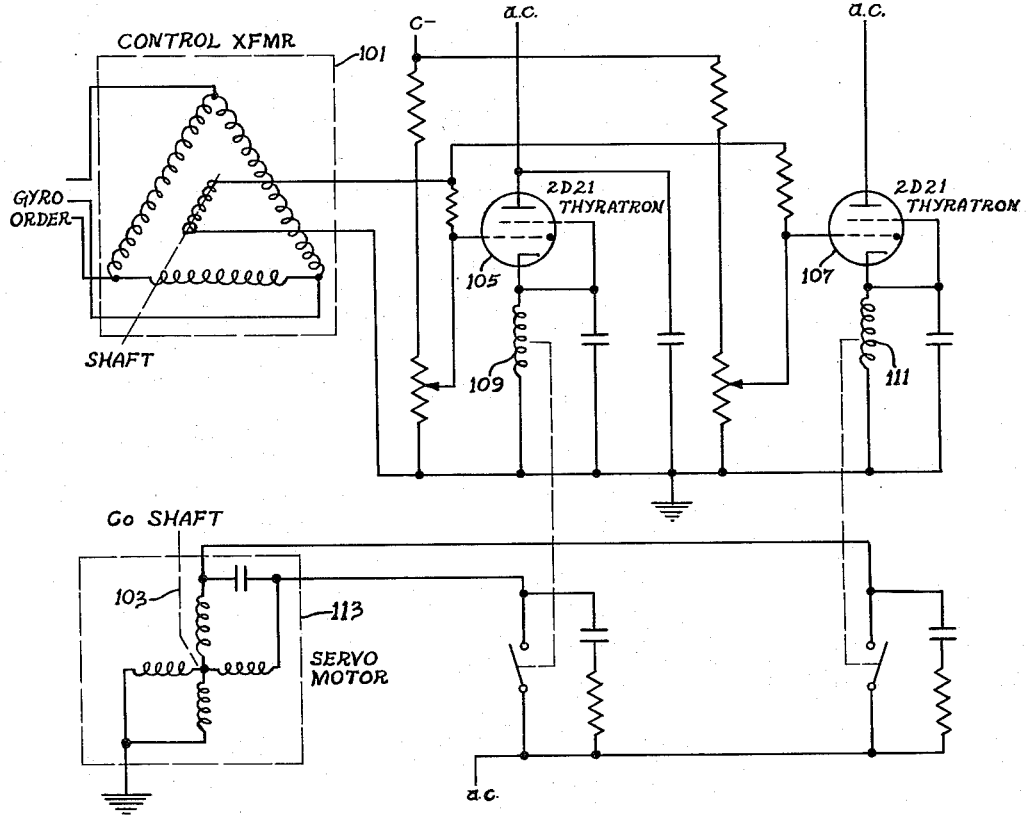

FIG. 8 is a schematic circuit diagram of the $C_o$ position servomechanism.

This device cooperates with standard shipboard sonar equipment to train individuals in the technique of properly and accurately utilizing sonar equipment. This invention simulates a target accurately in the aural and visual presentation channels of sonar equipment. The simulated target is presented, together with other targets that are within the scanning field of the sonar unit. Thus, this invention can be used when the ship, and the sonar equipment, is operating under normal conditions, or the ship is moored. This invention can also be utilized as a training aid regardless of the prevailing weather conditions or the time of day. The simulated target accurately reproduces an actual target in that the target echo strength varies with range, the beam pattern attenuation for the visual and aural presentation is in accordance with the directivity pattern of the sonar device, and the target echo frequency is varied or dopplered in accordance with the geometry of the problem, as would be an actual target echo.

This invention includes two principal components. The computer component is an electro-mechanical device that operates on the geometrical input data to produce shaft rotations corresponding to range and bearing of the synthetic target, and the simulator component is primarily an electronic device that provides for the range and bearing gating of the simulated target ech.

The instructor controls the simulation problem of the unit by means of the computer. Using appropriate controls, he sets into the computer the initial position of the synthetic target relative to own-ship position, the synthetic target course and speed, and own-ship speed. During the actual operation of own-ship, the own-ship course is automatically set into the computer by means of a servo-mechanism operating on the own-ship gyro order. When the ship is moored, synthetic own-ship course is set manually by the instructor.

The computer converts these mechanical inputs into electrical quantities that are modified and combined to produce electrical signals that correspond to the rate of change of relative range and rate of change of the true bearing. Each of these signals is utilized to control a velocity servomechanism, by which an output shaft is made to rotate with a speed proportional to the input signal. Thus, two shafts, whose speeds correspond to the rate of change of range and true bearing, are available, so that the total rotations of these shafts are measures of the range and the true bearing, respectively, of the synthetic target.

Appropriate potentiometers and synchros that are attached to these shafts convert this mechanical information back into electrical quantities, in which form it is utilized by the simulator unit to produce an echo having the proper characteristics at the proper instant. As the frequency of the echo is dependent upon the rate of change of the range, and as a signal that is proportional to the rate of change of the range is generated within the computer, the computer supplies the means of dopplering the simulated echo.

Another servomechanism is incorporated within the computer for the purpose of providing gating in the sonar audio channel. This servo drives a shaft in synchronism with the audio scanning switch, thereby providing means for "gating on" a simulated echo in the sonar audio receiver when the operator trains the audio scanning switch to the computed value of the synthetic true bearing.

In addition to computing the range and true bearing of the synthetic target continuously, the computer also generates the relative bearing and the angle on the bow of the synthetic target. This information is displayed on the front panel of the computer.

In the simulator unit, the device provides the means of generating the doppler-shifted echo voltage, of gating it in accordance with the information derived from the output shafts of the computer, of providing beam pattern attenuation in accordance with the sonar transducer pattern, and of inserting the simulated echoes into the receiver channels of the sonar unit.

To assist in understanding the description of the device, the definitions of the nomenclature used is as follows:

$B_q$ = Sonar target true bearing. The angle between a north and south vertical plane and the vertical plane through the line of sight to the sonar target, measured in a horizontal plane clockwise from north.

$B_{rq}$ = Sonar target relative bearing—the angle between the vertical plane through the fore and aft axis of own-ship and the vertical plane through the line of sight to the sonar target, measured in a horizontal plane clockwise from the bow.

$B'_{r'q}$ = Azimuth sonar train—the angle between the fore and aft axis of own-ship and the plane perpendicular to the deck through the line of sight to the sonar target, measured in the sonar deck plane clockwise from the bow.

$AOB$ = Angle on the bow—the angle between the fore and aft axis of the target ship and the line of sight to own-ship, measured clockwise from the bow of the target ship.

$C_o$ = Own-ship course—the angle between the north and south vertical plane and the vertical plane through the fore and aft axis of own-ship, measured in a horizontal plane clockwise from the north. This is the angle that is normally measured by the gyro compass.

$C_t$ = Target ship course—the angle between the north and south vertical plane and the vertical plane through the fore and aft axis of the target ship, measured in a horizontal plane clockwise from the north. This is the angle that is normally measured by the gyro compass aboard the target ship.

$S_o$ = Own-ship speed—the instantaneous speed of own-ship.

$S_t$ = Target ship speed—the instantaneous speed of the target ship.

$R$ = Range of target ship—the distance between target ship and own-ship measured along a straight line joining them.

$\dot{R}$ = Rate of change of range—the change of target ship range per unit of time.

$\dot{B}_q$ = Rate of change of sonar target true bearing—the change in sonar target true bearing angle per unit of time.

Figure 1:
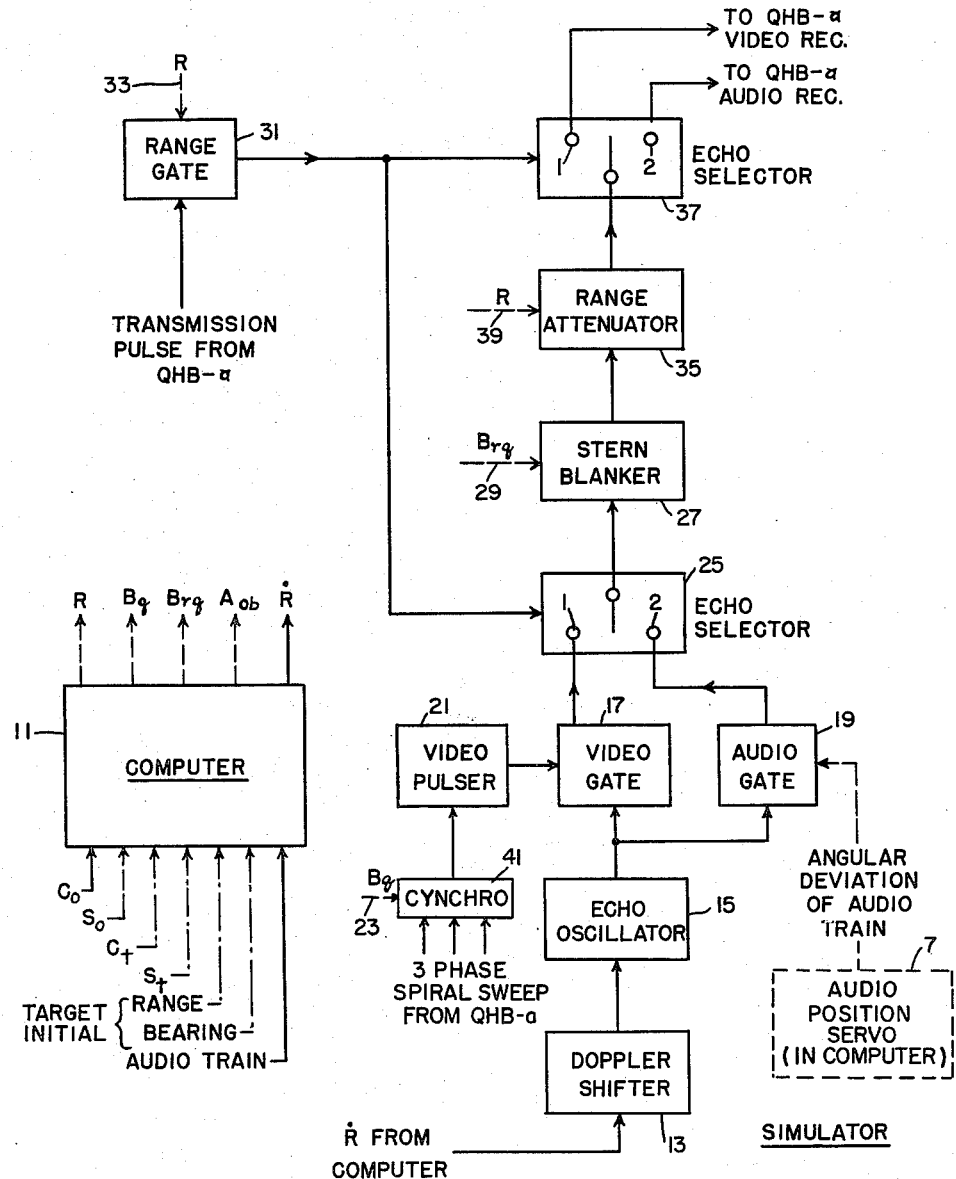
FIG. 1 is a block diagram of the computer and the simulator.

FIG. 1 shows a block diagram illustrating the over-all operation of the device. The own-ship gyro amplifier (not shown—a conventional ship instrument) supplies a sixty cycle per second order corresponding to own-ship course $C_o$ to the position servomechanism within the computer 11. Own-ship speed $S_o$ and target ship initial position R and true bearing $B_q$ and course $C_t$ and speed $S_t$ information are supplied manually by the instructor.

This information is operated upon and combined to produce within the computer 11 shaft rotations that correspond to range (R), angle on the bow (AOB), target ship true bearing ($B_q$), target ship relative bearing ($B_{rq}$), angle of train of the sonar unit audio scanning switch, and an electrical signal corresponding to the rate of change of the range ($\dot{R}$).

The rate of change of range signal, $\dot{R}$, is a measure of the doppler shift of the transmitted frequency pulse. This signal is used to modulate the frequency of a local 25.5-kc. center frequency oscillator 15. A signal of the proper frequency is fed from this oscillator 15 to the video bearing gate 17 where the oscillation is converted by the output of the video pulser 21 into a pulse of voltage whose shape corresponds to the directivity pattern of the sonar unit transducer and to the actual sonar unit output pulse. The position of the video pulse is determined by the computer true bearing shaft ($B_q$) 23, so that when coupled into the sonar unit video receiver the pulse causes sonar unit display to brighten at a bearing equal to the computed value of $B_q$. The video pulse thus formed is coupled through the echo selector circuit 25 to the stern blanking circuit 27, where a linear potentiometer mounted on the relative bearing shaft 29 of the computer acts to attenuate simulated target echoes originating at relative bearings from 170 degrees to 190 degrees.

Normally, the arm of the selector is in its neutral position. It is connected to the video contact 1 when energized by the range gate circuit 31. This circuit consists of a phantastron whose function it is to transmit a pulse after a determined time following the reception of an initiating pulse from the sonar unit. After an interval of time, determined by the range shaft 33 and corresponding to the transmit time of sound travelling out and back this distance in the sea, the phantastron develops a pulse that operates to close the video unit in the echo selectors for a period of approximately 30 milliseconds, that being equal to the pulse length of the sonar unit transmitted pulse. During the 30 ms. time interval, the output of the video bearing gate 17, consisting of a short pulse of doppler-shifted energy, is coupled to the stern blanking circuit 27, then to the range attenuator 35 and then through a second echo selector 37. The range attenuator 35 consists of a resistive network that is driven by the range shaft 39 so that the output voltage is attenuated in the same degree as an actual pulse is in traveling out and back a distance R in the sea. The properly attenuated video pulse is transmitted to the sonar unit video receiver to generate a trace brightening, thus simulating an actual target echo on the sonar unit oscilloscope at the computed range and bearing.

After the 30 ms. close period, the video connection 1 in the echo selectors is opened and the audio connection 2 is established for 30 ms. During this period the CW doppler-shifted energy from the oscillator 15, properly gated in accordance with the transducer directivity pattern for the off-train error between the target bearing and the train of the audio scanning switch, is fed through the stern blanking circuit 27 into and out of the range attenuator 35. This signal is the audio echo. It is fed to the sonar unit audio receiver where it serves to initiate a response in the sonar unit loudspeaker at the proper instant and having characteristics similar to an actual echo.

Figure 2:
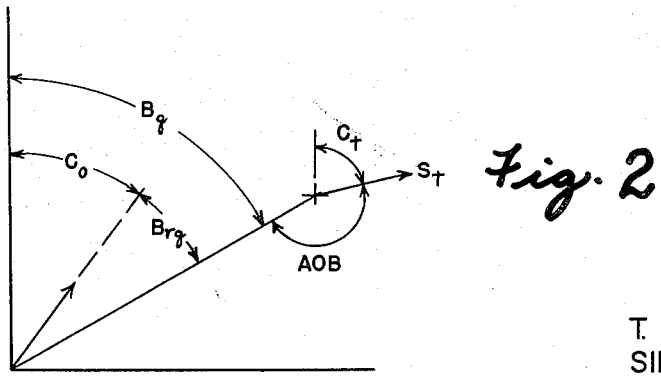
FIG. 2 is a graphic illustration of the problem to be solved by the computer.

FIG. 2 illustrates geometrically the problem that is solved by the computer 11. $S_o$ is own-ship speed and $C_o$ is own-ship true bearing. $B_{rq}=B_q-C_o$ is the target ship relative bearing, and $S_t$ and $C_t$ are the target ship speed and course respectively. From FIG. 2 the rate of change of range is $$\dot{R} = S_t \cos(B_q - C_t) - S_o \cos(B_q - C_o)$$

and the rate of change of true bearing is $$R(\dot{B}_q) = S_o \sin(B_q - C_o) - S_t \sin(B_q - C_t)$$

Thus, the elements of the computer receive the quantities $B_q$, $C_t$, $C_o$, $S_t$ and $S_o$, and operate on them in accordance with the above equations to produce electrical quantities that are proportional to $\dot{R}$ and $R\dot{B}_q$. These quantities are used to control two velocity servomechanisms which in turn cause output shafts to rotate at rates that are proportional to $\dot{R}$ and $\dot{B}_q$. The total rotation of the shafts, therefore, correspond respectively to R and $B_q$.

Figure 3:
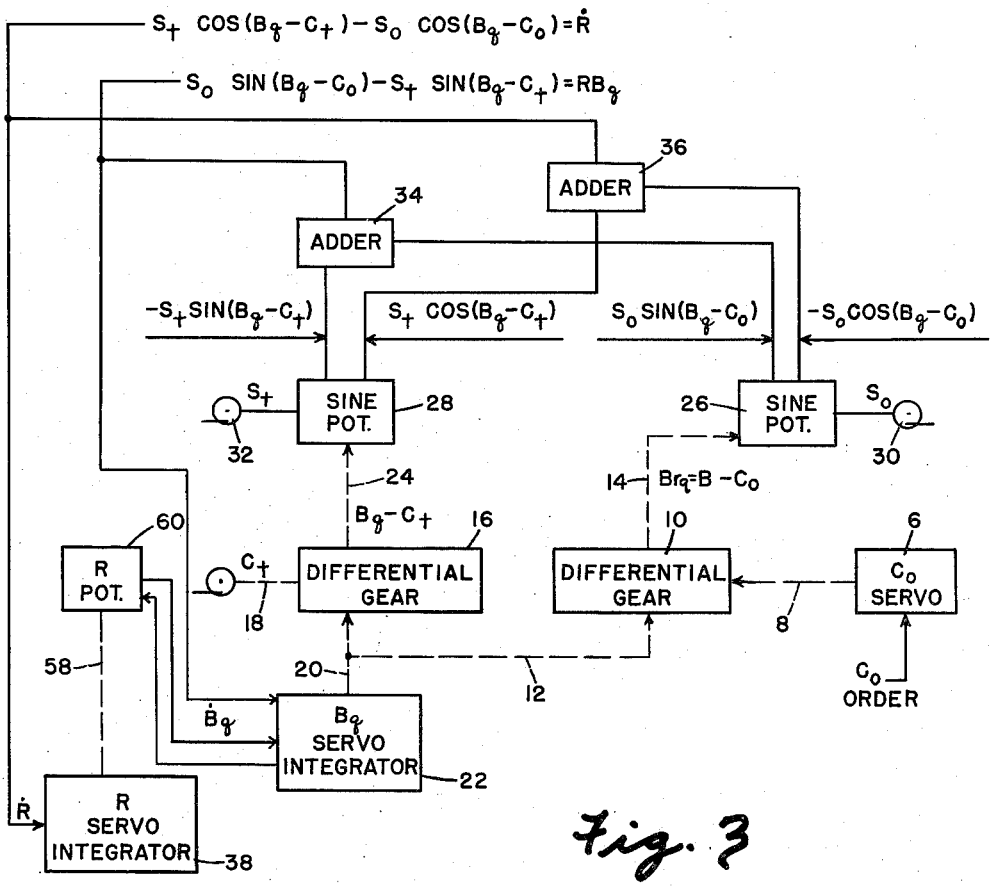
FIG. 3 is a block diagram of the computing circuits of the computer.

FIG. 3 shows a computer for determining the values of R and $R\dot{B}_q$. The computer has a feedback loop so that values of R and $B_q$ that appear at the output are fed back into the input of the computer in order to produce continuous solutions for the two equations when the quantities $S_o$, $S_t$, $B_q$, $C_o$ and $C_t$ are varying. Own-ship course, as indicated by the own-ship gyro, is transmitted to the $C_o$ position servo 6 in the computer to position the $C_o$ shaft 8. Said shaft 8 drives one gear of a differential gear 10. The other gear of said differential gear 10 is driven by a shaft 12 whose angular position is the target true bearing ($B_q$). The output shaft 14 of said differential gear 10 is, therefore, $B_q-C_o$ which is equal to the target relative bearing ($B_{rq}$).

Similarly, a shaft 18 that is connected to a gear of another differential gear 16 is driven manually by the instructor to indicate the synthetic target course ($C_t$). The other shaft 20 of said differential gear 16 is driven by the target true bearing ($B_q$) servo integrator 22. The output shaft 24 is then $B_q-C_t$, which is related to the angle on the bow.

Each of the differential gear output shafts 14 and 24 drives a sinusoidal potentiometer 26 and 28 respectively. The input voltages to the sinusoidal potentiometers 26 and 28 correspond to the speed of own ship ($S_o$) and of target ship ($S_t$) and are controlled manually by the instructor by setting calibrated linear potentiometers (not shown) by means of manual controls 30 and 32 respectively. The output voltages derived from the sinusoidal potentiometer 28 are $S_t \sin(B_q-C_t)$, and $$S_t \cos(B_q-C_t)$$

Similarly the output voltages generated by the other sinusoidal potentiometer 26 are $S_o \sin(B_q-C_o)$ and $$S_o \cos(B_q-C_o)$$

Said four output voltages of the sinusoidal potentiometers 26 and 28 are combined in pairs in the adders 34 and 36 to produce $\dot{R}$ and $R\dot{B}_q$ as defined by the previously expressed equations. $\dot{R}$ and $R\dot{B}_q$ are D.C. voltages having magnitudes that are proportional to the quantities rate of change of the range, and the range times the rate of change of the target true bearing, respectively, and whose polarity is either positive or negative, with respect to ground, depending upon whether the range or bearing is increasing or decreasing. The $\dot{R}$ voltage is fed into the $\dot{R}$ velocity servo integrator 38, producing rotation of the R shaft 58 where the rotation is proportional to range. A linear potentiometer 60 is driven by the shaft 58 and operates on the $R\dot{B}_q$ voltage to produce a voltage that is equal to $\dot{B}_q$. This voltage is fed into the $B_q$ servo integrator whose shaft position 20 is the target true bearing.

Figure 4:
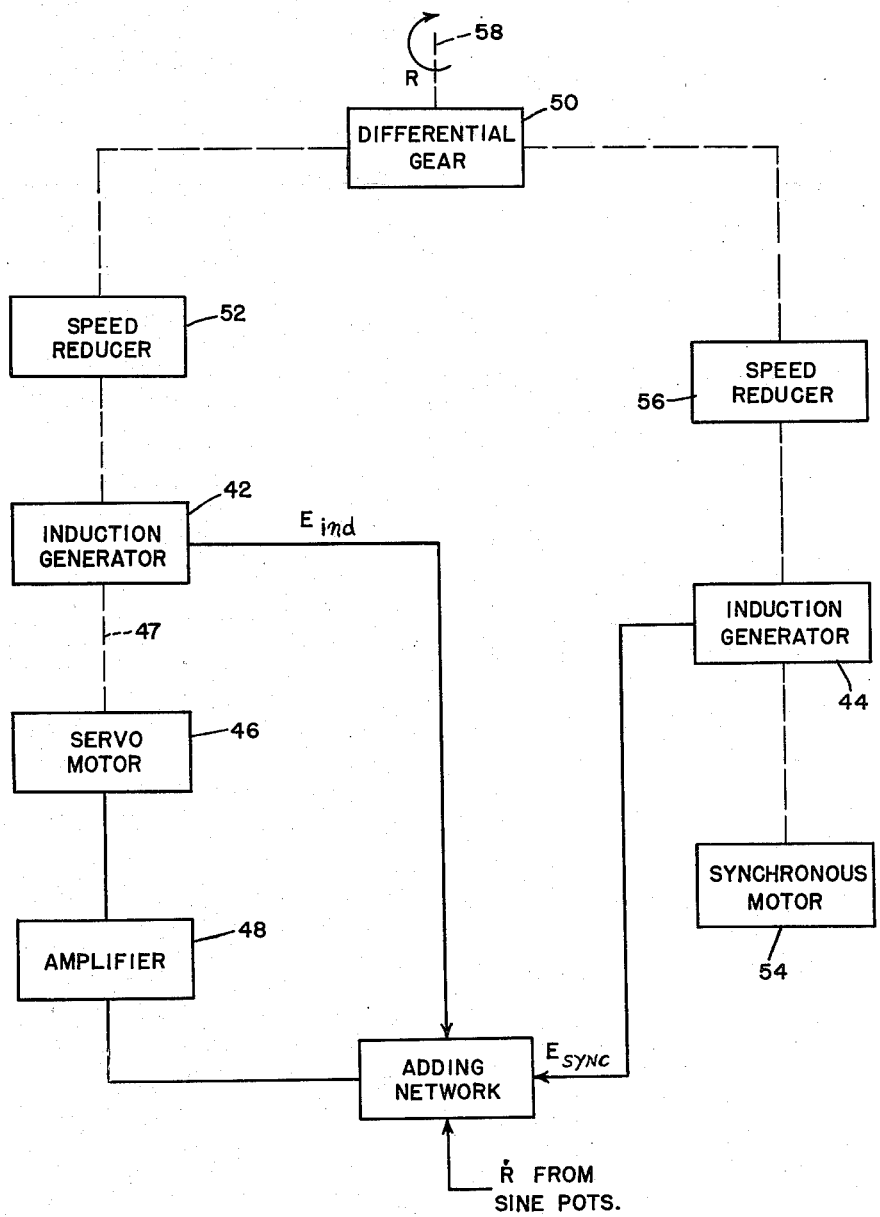
FIG. 4 is a block diagram of the R velocity servo mechanism integrator.

FIG. 4 shows a block diagram of the $\dot{R}$ velocity servo-mechanism integrator. The integrator is a closed loop system wherein the electrical signal that corresponds to the output shaft rotation is generated by standard drag-cup induction generators 42 and 44. When a source of singlephase power is used as an excitation source, the induction generator generates at its output terminals a voltage that is of the same frequency as the excitation voltage and of a magnitude that is proportional to the speed of the generator shaft. The $\dot{R}$ voltage is derived from the computing sinusoidal potentiometers 28 and 26 of FIG. 3 and is combined with the difference in the output voltage ($E_{sync}$) of the synchronous motor induction generator 42 and the output voltage ($E_{ind}$) of an induction motor induction generator. The sum $$\Delta = \dot{R} + E_{sync} - E_{ind}$$

drives the induction motor 46 through the servo amplifier 48. The shaft 47 of said induction motor 46, in turn, drives the induction generator 42 and a cage gear of the differential gear 50 through a speed reducer 52 which may comprise a simple set of step-down gears, for example. A synchronous motor 54 that is operated from the singlephase line drives a second induction generator 44 and the other cage gear of the differential gear 50 through a speed reducer 56. With high gain, the action of the servo amplifier 48 is to drive the servo motor 46 until the quantity $\Delta$ becomes small. As the gain of the amplifier 48 approaches infinity, $\Delta$ approaches zero. Thus the output of the servo motor induction generator 42 is practically equal to $\dot{R} + E_{sync}$ at the steady state condition. As this voltage is proportional to the speed of the generator shaft, the speed of the cage gear that is driven by the servo motor 46 is $K(\dot{R} + E_{sync})$ where K is a constant. Similarly, the speed of the cage gear that is driven by the synchronous motor is $KE_{sync}$. Thus, the output shaft of the differential gear 50 rotates at a speed that is proportional to the difference of the cage gears, that being ½ $K\dot{R}$. Thus the output shaft 58 rotates at a speed that is proportional to $\dot{R}$ and its total angular displacement represents R range.

The advantage of operating the velocity servo in this manner is that the servo motor rotates in one direction only, and need not be reversible and go through zero speed. For example, the synchronous motor might run at a rotational speed of 900 r.p.m. The servo will then operate from 600 r.p.m. for the maximum negative $\dot{R}$ and 1200 r.p.m. for the maximum positive $\dot{R}$. If each speed reducer has a reduction of 300/1, the output shaft rotates at a maximum speed of ½ r.p.m. in either direction. A zero output speed is achieved by running the servo motor at 900 r.p.m. As neither motor reverses, the speed-reducers do not reverse and non-precision gears may be used, as backlash is not an important consideration.

It should be noted that variations in line frequency do not tend to introduce serious errors into the system. If the speed of the synchronous motor increases, the voltage from its induction generator increases, thus causing the speed of the servo motor to increase. This, in effect, cancels the effect of the frequency changes. In a similar manner, variations in line voltage tend to cancel themselves out.

Figure 5:
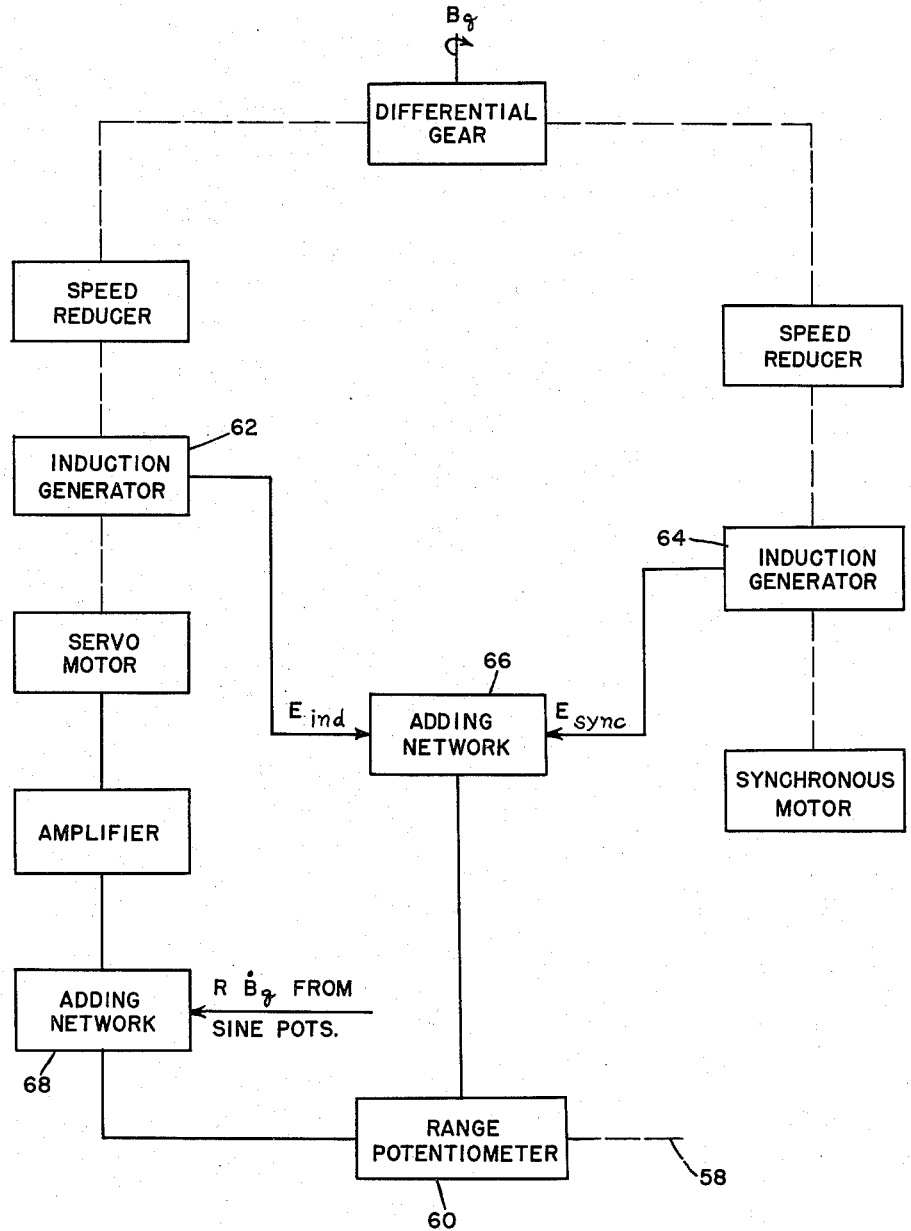
FIG. 5 is a block diagram of the rate of change of the sonar target true bearing integrator.

FIG. 5 shows a block diagram of the $R\dot{B}_q$ velocity servomechanism integrator. This integrator is identical with the R integrator with the addition of means of operating on the input electrical signal corresponding to $R\dot{B}_q$ to produce a shaft rotation corresponding to $B_q$. Therefore the details that are similar in nature will not be here repeated. The factor of range in the quantity $R\dot{B}_q$ is effectively removed by a linear potentiometer 60 that is mounted on the range shaft 58. This potentiometer 60 is wound to generate an output which is an inverse function of its shaft rotation. Thus, if shaft rotation is directly proportional to range (R) and an electrical signal directly proportional to range multiplied by rate of change of bearing ($R\dot{B}_q$) is applied across the potentiometer, range (R) will be eliminated from the output of the potentiometer 60. It should be noted that although the potentiometer 60 forms part of the $B_q$ servo integrator 22, as illustrated in FIG. 5, the potentiometer 60 is shown in the schematic of FIG. 3 as a separate component because of its physical separation from the components with which it is electrically associated in the servo integrator 22. The output voltages of the induction generators 62 and 64 are combined in an adding network 66, the sum of which is fed into the range potentiometer 60. A portion of the total generator voltage, proportional to range and effectively R times the difference in the outputs of the induction generator, is added in the summing network 68. As the generator difference is linearly proportional to $\dot{B}_q$, the feedback voltage corresponds to $R\dot{B}_q$ and is consistent with the input order.

The $C_o$ position servomechanism 6 (see FIGS. 7 and 8) is of standard design and construction. A one-speed own-ship gyro order is applied to the stator of a control transformer 101 that is geared to the $C_o$ shaft 103. The error voltage that results when the angular position of the $C_o$ shaft differs from the electrical angular order is coupled to the grids of push-pull thyratrons 105 and 107. Adjustable D.C. biases applied to these grids hold the thyratrons from firing in the absence of an error voltage.

When an error voltage exists, it is in-phase with the plate voltage of one thyratron and out of phase with the plate voltage of the other thyratron. Each thyratron has a relay cooperating with it and connected in the plate circuit. Hence, one relay 109 will act to drive the servo motor in one direction, and the other relay 111 will act to drive the servo motor 113 in the other direction. When the angular position of the servo motor shaft 103 coincides with the electrical angular order, neither relay operates and the servo motor 113 remains stationary. A standard magnetic brake that cooperates with the high speed shaft of the motor tends to prevent oscillations.

The audio position servomechanism 7 is similar to the $C_o$ position servomechanism 6 except for the higher voltage that is applied to the servo motor to provide improved servo performance on slewing. The electrical signal (audio train) that is utilized corresponds to the position of the sonar unit audio scanning switch and is fed through a synchro capacitor to a control transformer.

The simulation circuits of this trainer provide the properly timed and formed pulses which, when inserted into the sonar unit, represent the synthetic target echo.

FIGS. 6A and 6B illustrate a schematic diagram of the simulator. The vacuum tubes 80 and one-half of a vacuum tube, 82a, both of which are of the 12AU7 type, together are utilized to generate the synthetic echo energy. The tubes 80 and 86a, together with their components as illustrated in FIG. 6, operate as a phase-shift oscillator. The oscillation frequency is determined by the components that are included in the plate-to-grid coupling network such that the over-all phase shift of the network is zero degrees. The frequency of oscillation is adjusted to equal the operating frequency of the sonar unit by adjusting the potentiometer 84. The operating frequency of a sonar unit is approximately 25.5 kc. Under the actual conditions, of detection by sonar equipment, the echo frequency differs from the transmitted frequency by the doppler shift. In this invention, the vacuum tube 86 that consists of two portions, 86A and 86B, is of the 12AU7 type and said section 86A is utilized to shift the frequency. Variations in the plate resistance of the tube 86A result in linear frequency modulation of the oscillator portion. Said plate resistance then is varied by the D.C. voltage on the grid of the tube 86A. Said grid voltage is derived from the electrical signals that correspond to $\dot{R}$ as is generated by the sinusoidal potentiometers that are in the computer. The potentiometer 88 varies the frequency sensitivity and is adjusted to provide the proper frequency shift per knot range rate. This figure is approximately eighteen cycles per second per knot. The output of the oscillator tube 80 is amplified in the tube 86B and is then connected through the isolating cathode follower 82A to other circuits in the simulator.

A range gate pulse that is generated within the simulator is utilized to couple the synthetic video and audio signals to the sonar unit. The circuit, as illustrated, operates the relay contacts 90, 92, 94, 96 and 98 after a predetermined interval following the transmission of the sonar pulse. Said relay contacts are operated by the action of the coils 100, 102, 104, 106, and 108 respectively. This interval corresponds to the time that is required for sound to propagate in water to and from the computed range of the synthetic target. The range gate circuit comprises the vacuum tubes 110, 112A, 114B, 116A, 118A, 118B and their associated components. Said tube 110 is of the 6AS6 type, and the remaining tubes are of the 12AU7 type.

The trigger that is generated within the sonar unit at the beginning of each ping is coupled to the negatively biased suppressor grid of the tube 110 through a differentiating and clipping circuit. The delay time of the circuit is determined by the time constant that is formed by the resistors 120 and 122, the capacitor 124 and the value of the plate voltage at the instant of trigger initiation. By varying the voltage, the time delay can be varied. In this device, this variation is accomplished by the linear potentiometer 126 that is mounted on the range shaft in the computer. Thus, the quiescent plate voltage of the tube 110 is set proportionally to the target range and, therefore, the delay time is proportional to the target range.

Plate bottoming in the phantastron, which comprises tubes 110 and 116A and their associated components, is indicated by a large decrease in screen voltage of tube 110. This drop is coupled to the grid of the phase inverting amplifier 116A, that is of the 12AU7 type, thereby producing a positive gate at the plate. Said positive gate is differentiated by the condensor 128 and resistor 130 to form a positive pulse that is then applied to the grid of the tube 118. This positive pulse overrides the negative bias that is present in the grid, thus actuating the relay coils 102, 104 and 106. The video echo is formed during the closed period of the contacts that are associated with said coils. The audio echo, in contrast to the actual visual echo, is formed a short time after this period at the time the relay coils 100 and 108 are energized by the application of a positive pulse that is formed when the video relay contacts 94 are open to the grid of the tube 118B.

The output of the echo oscillator is coupled through the capacitor 132 and the gain control potentiometer 134 to the control grid of the tube 136 that is of the 6AS6 type. Upon application of the proper gating pulse to the suppressor grid of said tube 136, an amplitude modulated envelope of the oscillator frequency representing the simulated video pulse is available at the plate. This gating pulse is derived from the sonar unit sweep voltage and the computed true bearing and range of the synthetic target, and causes the synthetic echo to be injected into the sonar unit video receiver at a time when the sonar unit sweep passes the synthetically generated target position.

The three phase voltage that is utilized within the sonar unit to generate the spiral sweep is applied to the stator of a synchro 41 that is used as a phase shifter. The voltage that is induced within the rotor of said synchro is a single-phase voltage of approximately thirty cycles per second and having a phase angle, with respect to a reference, proportional to the angular displacement of the rotor shaft. As said rotor is positioned by the target true bearing shaft ($B_q$) 23 the single phase voltage that is derived from the rotor is phased proportionally with respect to the synthetic target true bearing. Said rotor signal is then fed to the grid of the tube 12B through the resistor 138. The amplified signal is fed to the grid of the sharp cut-off pentode amplifier 140 through the condensor 142 and the resistor 144. The resistor 146 acts to clip the wave through plate current cut-off action to produce a square wave at the plate of said tube 140. The position of the sides of the square wave are an indication of the true bearing of the target. The resistor-capacitor differentiators 148 and 150 convert the square waves into a series of pulses. The rectifier 152 is polarized to clip the negative pulses.

Upon the closing of the relay 102 for approximately thirty milliseconds through the action of the range gate circuit, one positive pulse is applied through the capacitor 154 to the suppressor grid of the vacuum tube 136. The negative bias of the suppressor grid of said tube 136 is set by the resistors 156, 158 and 148 and coupled through the resistor 160 thus preventing plate current from flowing in the absence of a positive pulse. However, in the presence of such a pulse, the suppressor voltage is momentarily raised, permitting plate current to flow and thus producing an envelope of R-F energy that is applied to the signal grid of the tube 116B. The shape of this envelope is controlled by the shape of the initiating pulse and the negative bias on the suppressor grid and represents the video echo.

The vacuum tube 116B functions as a cathode follower isolating element to couple the video pulse thus formed into the stern blanking circuit. This circuit, consisting of a fixed resistor 162 and the potentiometer 164, attenuates echoes from bearings near the stern in order to simulate the own-wake masking. The potentiometer 164 is mounted on the shaft in the computer whose position corresponds to the target relative bearing. When the relative bearing is between 170 degrees and 190 degrees, the low resistance loads the output of the tube 116B, thus reducing the echo level.

The range attenuator circuit simulates the attenuation echoes undergo in propagating from the sonar transducer to the target and back. The range attenuator consists of ganged potentiometers 166 that are mounted with a group of fixed resistors on the range shaft.

The range attenuated, stern blanked, range and bearing gated echo is coupled into the sonar unit through the relay contacts 96 and the resistor 168. Said contacts 96 are normally grounded, but are connected to the output of the range attenuator for approximately 30 milliseconds by the action of the range gate circuit operating on the vacuum tube 118A, in which plate circuit the relay is connected. Said resistor 168 serves to isolate this invention from the sonar unit receiver input circuit into which the video is connected.

The dopplered output of the cathode follower 82A is fed through the capacitor 132 to the audio bearing gate circuit. The function of this circuit is to simulate the directivity pattern of the sonar unit audio transducer, thereby effecting the bearing gating of the synthetic echo. The operation of the circuit is dependent upon a servomechanism (not shown) to follow the operator's positioning of the audio scanning switch and a bridge circuit to simulate the transducer directivity pattern.

The output shaft of a differential gear drives a linear precision potentiometer 170. Said potentiometer 170 is tapped at its center point and at points that are displaced ten degrees from the centerpoint. The resistors 172 and 174 are connected to said tapped positions; thus the combination of the resistors 170, 172 and 174 form one arm of the Wheatstone bridge that comprises the resistors 176, 144, 178 and the condensor 180. When the movable contact of the potentiometer 170 is at the center position, the bridge is not balanced, thus producing a large output voltage. Varying the position of the movable contact of said potentiometer 170 from the center position tends to balance the bridge, thus increasing the attenuation of the circuit. The output voltage of said bridge circuit is fed into the tube 82 that functions as an isolating cathode follower, through a transformer 182. Variation of the wiper arm by an amount that is in excess of ten degrees from its center position tends to unbalance the bridge, thus reducing the attenuation and producing unrealistic simulation results. This is avoided by the utilization of a limit switch 184 tha is operated by a cam that is mounted on the bearing deviation shaft. This cam is shaped to close the limit switch for all deviation angles that exceed ten degrees. During operation, said switch connects the resistor 186 in series with the audio echo signal, thus attenuating it for all bearing deviations that exceed plus or minus ten degrees.

The video echo is coupled through the stern blanking circuit and the range attenuator into the sonar unit during the period in which the relay coils 102 and 106 are operated. The ready coil 104 is also operated during this period, thus grounding the junction point of the resistors 188 and 190. At the end of the video period, the relay contact arm 94 returns to its de-energized position; the ground at the resistor junction is thereby removed and a positive gate is formed. The leading edge of this gate is differentiated by the resistor, capacitor network 192, 194, and the positive pulse is coupled to the grid of the vacuum tube 118B. The resulting pulse of plate current energizes the audio relay coils 100 and 108. The duration of energization of said relays 100 and 108 is controlled by the amplitude of the pulse and the negative bias that is fed to the grid; however, said time is preset to be approximately thirty milliseconds. The operation of the relay coil 100 acts to feed the audio signal through the cathode follower 196, that is of the 12AU7 type vacuum tube, to the range attenuator 166. The attenuated signal is then coupled to the sonar unit through the relay contacts 98 and the isolating resistor 200.

Obviously many modifications and variations of the present invention are possible in the light of the above teachings. It is therefore to be understood that within the scope of the appended claims the invention may be practiced otherwise than as specifically described.

We claim:

1. An integrating computer comprising a first adding network adapted to receive and add a plurality of inputs, an amplifier, a servo motor coupled electrically to the output of said adding network through said amplifier, a first induction generator driven mechanically by the rotor of said servo motor, said generator being coupled to feed a signal into said adding network, a second induction generator coupled electrically to the input of said adding network to feed a signal thereto, means coupling said first and second induction generators and providing an output rotational speed which is the difference between the speeds of said induction generators, and a synchronous motor connected to rotate said second induction generator at a constant speed.

2. An integrating computer for integrating electrical rate of change information comprising an adding network to receive such information, an amplifier connected to receive information from said adding network, a servo motor of the inductor type connected electrically to the output of said amplifier, an induction generator connected mechanically to the rotor of said servo motor and connected electrically to feed a signal into said adding network, a first speed reducer connected mechanically to said induction generator and adapted to provide an output rotational speed which is lower than the rotational speed of said induction generator, a differential gear having one of its input shafts connected mechanically to the output of said speed reducer, a second speed reducer connected to another input shaft of said differential gear, a second induction generator connected mechanically to the second speed reducer and connected electrically to feed a signal into said adding network, and a synchronous motor connected to rotate said second induction generator at a constant speed, the signal applied to said amplifier from said adding network being the sum of the rate of change information and the output of the servo-motor induction generator less the output of the synchronous-motor induction generator.

3. An integrating computer for integrating rate of change information comprising a first adding network to receive said information, an amplifier connected to receive information from said first adding network, a servo motor electrically connected to the output of said amplifier, a second adding network, an induction generator mechanically connected to the rotor of said servo motor and electrically connected to feed a signal into said second adding network, a potentiometer connected to receive the output of said second adding network and connected to apply its output to said first adding network, means to adjust the potentiometer, a first speed reducer mechanically connected to said induction generator, and adapted to provide an output rotational speed which is lower than the rotational speed of said induction generator, a differential gear having one of its input shafts mechanically connected to said speed reducer, a second speed reducer mechanically connected to a second input shaft of said differential gear, a second induction generator mechanically connected to the second speed reducer and electrically connected to feed a signal into said second adding network, and a synchronous motor connected to rotate said second induction generator at a constant speed, the signal applied to said amplifier from said first adding network being the sum of the rate of change information and the output of the servo-motor induction generator less the output of the synchronous-motor induction generator.

References Cited in the file of this patent

UNITED STATES PATENTS

| | | |
|---|---|---|
| 2,688,442 | Droz et al. | Sept. 7, 1954 |
| 2,751,689 | Jones et al. | June 26, 1956 |

FOREIGN PATENTS

| | | |
|---|---|---|
| 668,660 | Great Britain | Mar. 19, 1952 |